United States Patent
Rietzler et al.

(10) Patent No.: US 8,547,288 B2
(45) Date of Patent: Oct. 1, 2013

(54) ANTENNA FOR CHIP CARD PRODUCTION

(75) Inventors: Manfred Rietzler, Marktoberdorf (DE); Raymond Freeman, Mesa, AZ (US)

(73) Assignee: Smartrac IP B.V., Amsterdam (NL)

( * ) Notice: Subject to any disclaimer, the term of this patent is extended or adjusted under 35 U.S.C. 154(b) by 234 days.

(21) Appl. No.: 12/994,048

(22) PCT Filed: Apr. 29, 2009

(86) PCT No.: PCT/EP2009/003099
§ 371 (c)(1),
(2), (4) Date: Nov. 22, 2010

(87) PCT Pub. No.: WO2009/141043
PCT Pub. Date: Nov. 26, 2009

(65) Prior Publication Data
US 2011/0074645 A1  Mar. 31, 2011

(30) Foreign Application Priority Data
May 23, 2008 (DE) .......................... 10 2008 024 825

(51) Int. Cl.
*H01Q 9/28* (2006.01)
(52) U.S. Cl.
USPC ........................................................ 343/795
(58) Field of Classification Search
USPC ......................... 343/795, 866, 700 MS, 860
See application file for complete search history.

(56) References Cited

U.S. PATENT DOCUMENTS

| 6,259,408 | B1 * | 7/2001 | Brady et al. ........... 343/700 MS |
| 2006/0158380 | A1 | 7/2006 | Son et al. |
| 2007/0052613 | A1 | 3/2007 | Gallschuetz et al. |
| 2007/0132594 | A1 | 6/2007 | Masuta |
| 2007/0164414 | A1 | 7/2007 | Dokai et al. |
| 2007/0290928 | A1 | 12/2007 | Chang et al. |
| 2008/0012709 | A1 | 1/2008 | Stobbe et al. |
| 2008/0157976 | A1 * | 7/2008 | God et al. ................... 340/572.7 |
| 2009/0109102 | A1 | 4/2009 | Dokai et al. |
| 2012/0074230 | A1 * | 3/2012 | Bernhard et al. ............. 235/492 |

FOREIGN PATENT DOCUMENTS

| CA | 2611620 A1 | 12/2006 |
| DE | 201 05 170 U1 | 2/2001 |
| DE | 601 19 755 T2 | 3/2007 |
| DE | 10 2005 058 101 A1 | 6/2007 |
| DE | 10 2006 054078 A1 | 11/2007 |

(Continued)

OTHER PUBLICATIONS

PCT International Preliminary Report on Patentability, Application No. PCT/EP2009/003099, Dec. 16, 2010.

(Continued)

*Primary Examiner* — Huedung Mancuso
(74) *Attorney, Agent, or Firm* — Quarles & Brady LLP

(57) ABSTRACT

The present invention relates to an antenna arrangement (10) for the production of chip cards, in particular chip cards used in the UHF frequency range, having a substrate and a plurality of antenna conductor structures (11) formed on the substrate using a coating method, the antenna conductor structures having a terminal arrangement (24) for connecting the antenna conductor structures to a chip, wherein the substrate is formed as a substrate sheet (12), and the antenna conductor structures are disposed on the substrate sheet in a matrix arrangement (13) having a plurality of columns and rows.

8 Claims, 3 Drawing Sheets

(56) References Cited

FOREIGN PATENT DOCUMENTS

| | | |
|---|---|---|
| DE | 10 2006 0521517 A1 | 5/2008 |
| DE | 102006052517 A1 | 5/2008 |
| JP | 2006059146 A | 3/2006 |
| JP | 2007148866 A | 6/2007 |
| JP | 2007150868 A | 6/2007 |
| JP | 2007312350 A | 11/2007 |
| WO | 2006056280 A1 | 6/2006 |
| WO | 2007065404 A2 | 6/2007 |
| WO | 2008007606 A1 | 1/2008 |
| WO | 2008055579 A2 | 5/2008 |

OTHER PUBLICATIONS

International Search Report under date of Aug. 14, 2009 in connection with PCT/EP2009-003099.
Finkenzeller, Klaus: "RFID-Handbuch: Grundlagen und praktische Answendungen induktiver Funkanlagen, Transponder und kongtaktloser Chipkarten" 1998, Hanser, Munchen; XP002541372; ISBN: 3-446-19376-6; Kapitel 12.4 (Seiten 210-214).
Japan Patent Office, Notice of Reasons for Refusal, JP 2011-509870, Apr. 17, 2013.
State Intellectual Property Office of People's Republic of China, First Office Action, Application No. 200980128773.5, Feb. 5, 2013.

* cited by examiner

ANTENNA FOR CHIP CARD PRODUCTION

CROSS-REFERENCE TO RELATED APPLICATIONS

This application claims priority to PCT International Application No. PCT/EP2009/003099 filed on Apr. 29, 2009, which claims priority to German Patent Application No. 10 2008 024 825.8 filed May 23, 2008, both of which are incorporated herein by reference.

The present invention relates to an antenna arrangement for the production of chip cards, in particular chip cards used in the UHF frequency range, having a substrate and a plurality of antenna conductor structures formed on the substrate using a coating method, the antenna conductor structures having a terminal arrangement for connecting the antenna conductor structures to a chip.

Antenna arrangements of the above-cited type are utilized in particular in the implementation of the antenna conductor structure in the form of a dipole arrangement in transponders which are operated in the UHF frequency range. Due to the formation of the antenna conductor structures using a coating method, and provided that the antenna substrate, which may for instance also be formed by a foil, is designed with an adequate degree of flexibility, the antenna arrangements of the above-cited type also feature a special suitability for the production of so-called tags, which are frequently employed for product labeling and which are planarly applied to the surface of the product to be labeled. Irrespective of the embodiment of the transponder, in which the antenna conductor structure produced using a coating method is used, in the production of the transponders, i.e. for instance of the chip cards or tags, it has hitherto been common practice for producing a plurality of transponders to dispose the antenna conductor structures in a row arrangement on a carrier strip designed in the form of an infinite substrate. In the production of the transponders, the carrier strip being rolled up to form a supply roll is continuously unwound and the antenna conductor structures are separated from the supply roll by cutting off substrate segments.

Subsequently, contacting of the antenna conductor structures disposed on the separated antenna substrates with a chip module is performed and cover layers covering the antenna substrate on both sides are applied for producing the chip card or the tag.

The known method thus necessitates the handling of the antenna substrates separated from the supply roll for producing the transponder, i.e. for instance the chip card or the tag. This handling of the separated antenna substrates is a laborious procedure in particular if subsequent to the separation, for preparing a lamination process, the separated antenna substrates are applied to cover layers which are coherently formed in a panel structure, since for each cover layer in the panel structure, the assigned antenna substrate needs to be positioned differently.

Thus, it is an object of the present invention to suggest an antenna arrangement which enables a simplified production of transponders using a lamination method.

In the inventive arrangement, the substrate is formed as a substrate sheet and the antenna conductor structures are disposed in a matrix arrangement having a plurality of columns and rows on the substrate sheet, so that simultaneous positioning of a plurality of antenna conductor structures disposed in a matrix arrangement can be performed on a cover layer substrate having cover layers disposed in a matrix structure.

Due to the antenna arrangement designed according to the invention, it is hence possible to dispense with the need for positioning each separated antenna substrate individually for the purpose of a congruent arrangement with an assigned cover layer. Instead, it is sufficient to produce a congruent arrangement of the antenna conductor structures disposed in a matrix arrangement with the cover layers disposed in a corresponding matrix arrangement in a single positioning step. If the cover layers, which serve the purpose of covering the antenna conductor structure on the antenna substrate in an insulating manner, are equipped with a chip or are for instance entirely formed as a chip module in which the cover layer serves as a carrier substrate for the chip, it is possible to carry out a positioning alignment of the terminal arrangement of the antenna conductor structure with the terminal faces of the chip simultaneously with the arrangement of the plurality of antenna conductor structures on the cover layer structure for subsequent contacting of the chip with the antenna conductor structure.

The antenna arrangement proves to be particularly advantageous if the antenna conductor structure features at least one dipole arrangement, since thus the production of UHF transponders is possible in a lamination process, without the need for handling the separated antenna substrates. In particular if the dipole arrangement is designed in an asymmetric fashion, a handling of the antenna conductor structures, which are disposed on the antenna substrate in a coherently formed structure, proves to be easier compared to the handling of separated antenna conductor structures due to the unfavorable center-of-gravity distribution resulting from the asymmetry.

If the dipole arrangement is formed of a wire conductor, the production of the dipole arrangement is rendered possible by laying the wire conductor on the surface of the substrate sheet.

In a preferred embodiment, the antenna arrangement comprises the formation of a dipole arrangement, which features a first antenna strand and a second antenna strand, which each extend longitudinally along a column separation line and a row separation line for separating the antenna conductor structures, and which are connected to one another in an intersection zone of the separation lines via a coupling conductor section. Antenna conductor structures designed in this manner enable an optimized arrangement in an edge region of the antenna substrate, which significantly minimizes the risk that parts of the dipole arrangement of the antenna conductor structure are covered due to the grasping hand in case of manually grasping a transponder which is designed as a chip card.

By means of the aspect that the antenna conductor structure is disposed remote from a "grasping zone" in a lateral edge region of the substrate, it is possible to grasp the card from at least one lateral edge of the chip card in a normal manner, i.e. by placing the thumb or at least one finger in the central region of the card, without giving rise to the inevitable consequence that the antenna is detuned. In the preferred embodiment, by means of the arrangement of the extremely asymmetrical and eccentric antenna conductor structures in a common matrix arrangement, the antenna arrangement enables the effortless handling of the antenna conductor structures in the production of the chip cards in a lamination process.

If, according to a particularly preferred embodiment of the antenna arrangement, the terminal arrangements for connecting the antenna conductor structures to the chip are designed in the from of a loop dipole having a coupling conductor section which is disposed in parallel to the coupling conductor section of the assigned antenna conductor structure, it is possible to dispose the terminal arrangements, respectively the chip contacted with the terminal arrangement, laterally to the antenna strands of the antenna conductor structure, so that with the aid of the antenna arrangement chip cards can be produced which have an antenna conductor structure, the antenna strands of which can be laid so as to substantially reach the lateral edge of the antenna substrate, in order to realize chip cards having an extremely large grasping zone.

If the terminal arrangements in the antenna arrangement feature at least two planarly formed terminal contacts, which extend via a substrate recess being open towards a substrate rear side, direct contacting of the antenna conductor structure with a component, for instance a chip, which is disposed on the rear side of the antenna substrate, i.e. on the side opposite to the antenna conductor structure, can be carried out without any further recontacting or rewiring. The terminal arrangement applied to the frontal side of the antenna substrate using a coating method essentially straddles the substrate recesses, which are freely accessible from the rear side of the antenna substrate, so that direct contacting of the terminal contact rear sides can be performed.

This arrangement, which straddles the substrate recesses, for instance can be produced by the aspect that prior to the application of the antenna conductor structure, respectively the terminal arrangement on the antenna substrate, recesses realized in the antenna substrate are temporarily filled with the antenna material during the coating of the antenna substrate.

If the terminal contacts are applied on the card substrate integrally with the coupling conductor section of the terminal arrangement as a material coating using a coating method, in spite of the arrangement of the terminal contacts straddling the substrate recesses, a sufficiently high degree of mechanical stability is attained.

In general, it proves to be advantageous if the antenna conductor structure and the terminal arrangement formed therein are formed of a congruent material coating, since thus the entire antenna conductor structure can be produced in a single coating step.

If the terminal arrangement is formed of aluminum or an alloy containing aluminum, in particular in the instance where the chip provided for the contacting with the terminal arrangement equally features terminal contacts of aluminum or of an alloy containing aluminum, a direct contacting of the chip terminal faces with the terminal contacts of the terminal arrangement can be carried out using an ultrasonic welding method.

If the terminal arrangement is formed of copper or an alloy containing copper, a contacting with a chip by means of a commonly used thermal bonding method is practicable.

It proves to be particularly advantageous if the antenna arrangement is configured as a laminate structure having two substrate sheets which each feature the terminal arrangements, respectively the dipole arrangements. Thus, variability of the local assignment of the terminal arrangements and the dipole arrangements in the plane of the substrate sheets is realizable, which permits the setting of the distance between the terminal arrangements and the dipole arrangements for the purpose of frequency tuning of the antenna conductor structures.

By the same token, it is possible to modify the local assignment of the dipole arrangement to adjacent laminate layers in the laminate structure of a chip card, in order to lay the dipole arrangements in selected regions of the chip card, in order to dispose the dipole arrangement remote from a "grasping zone" for instance in order to prevent detuning of the dipole arrangement.

Hereinafter, a preferred embodiment of the antenna arrangement will be described in more detail with reference to the drawings.

Figure 1:
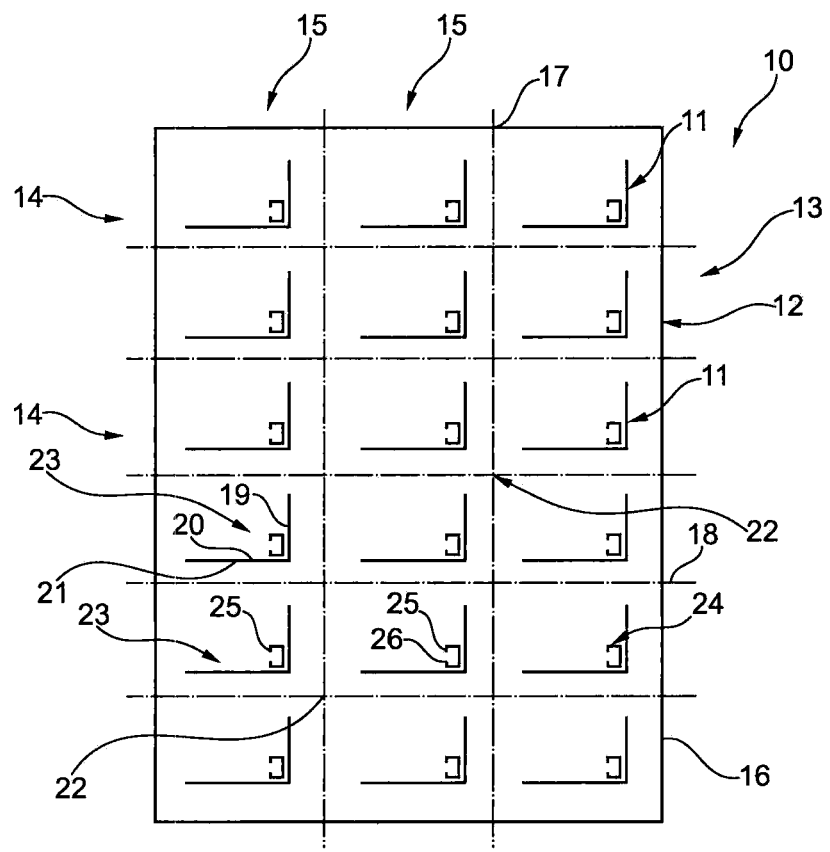
FIG. 1 shows an antenna arrangement having a plurality of antenna conductor structures which are disposed in a matrix arrangement on a substrate sheet.

FIG. 1 shows an antenna arrangement 10 having a plurality of antenna conductor structures 11, which are disposed on a substrate sheet 12 in a matrix arrangement 13. The matrix arrangement 13 in the present case comprises six rows 14 and three columns 15. The 6×3 matrix arrangement 13 illustrated in FIG. 1 encompasses a total of eighteen antenna conductor structures 11, which are each arranged on an antenna substrate 16 in such a manner that the antenna substrates 16 in their entirety form the substrate sheet 12. The dimensions of the antenna substrates 16 are defined by column separation lines 17 and row separation lines 18, which form predetermined separation lines for a subsequent separation of the antenna substrates 16 from the structure formed by the substrate sheet 12.

The material used for the substrate sheet 12 as well as for the further mentioned cover layers or chip carriers may for instance be PVC, PETG or else also a polycarbonate.

The individual antenna conductor structures 11 each feature a dipole arrangement 23, having an antenna strand 19 which extends longitudinally along a column separation line 17 and a second antenna strand 20 which extends longitudinally along a row separation line 18. The antenna strands 19, 20 are connected to one another via a coupling conductor section 21 which extends in sections essentially in parallel to the column separation line 17, respectively the row separation line 18, and which extends adjacent to an intersection zone 22 which is formed by the column separation line 17 and the row separation line 18. Adjacent to the coupling section 21 of the dipole arrangement 23, the terminal arrangement 24 is disposed, which in the present case is designed as a loop dipole and has planarly formed terminal contacts 25, 26.

Figure 2:
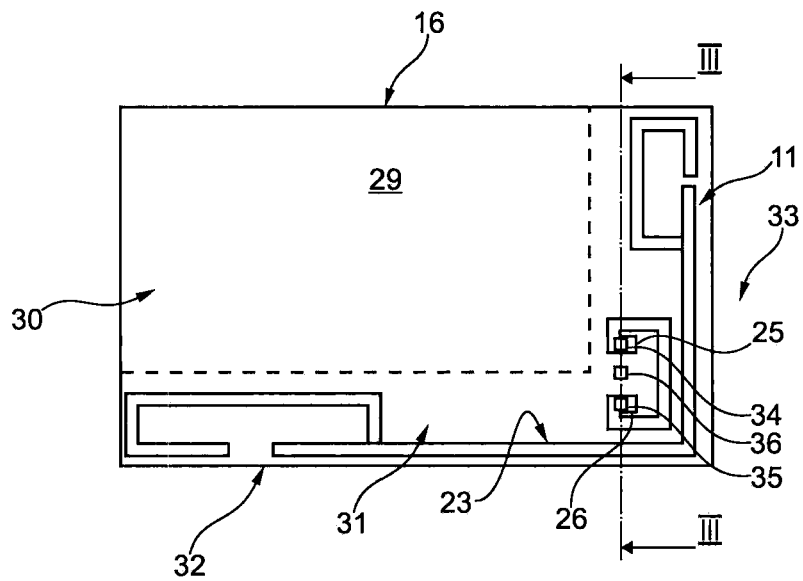
FIG. 2 shows an antenna substrate which has been separated from the substrate sheet.

As can be seen from the illustration of an antenna substrate 16 separated from the substrate sheet 12 in FIG. 2, the antenna strands 19, 20 at their free ends each feature open conductor loops, respectively conductor frames, which in the case at hand, are formed with different sizes and thus enable different frequency tuning of the dipole arrangement 23 which is respectively assigned to the antenna strands 19, 20.

The antenna substrate 16 illustrated in FIG. 2 features a substrate surface 29 which is divided into a grasping zone 30 and a transponder zone 31. Here, the grasping zone 30 refers to the region where at least partial covering of the antenna surface 29 can be performed by the thumb or the finger when a card user grasps the antenna substrate 16, respectively the chip card formed on the basis of the antenna substrate, without the consequence of a covering of the dipole arrangement 23, respectively the antenna conductor structure 11, which are accommodated in the transponder zone 31.

In the antenna substrate 16 illustrated in FIG. 2, the transponder zone 31 is formed substantially with an L-shape and accommodates the antenna conductor structure 11. Due to the L-shaped design of the transponder zone 31, the antenna conductor structure 11, respectively the dipole arrangement, merely extends directly adjacent to the lateral edges 32, 33 of the antenna substrate 16 in such a manner that a large degree of variability is enabled in the access to the antenna substrate 16, respectively the chip card formed therefrom, without giving rise to a covering of parts of the dipole arrangement 23 by the thumb or fingers of the grasping hand.

Figure 3:
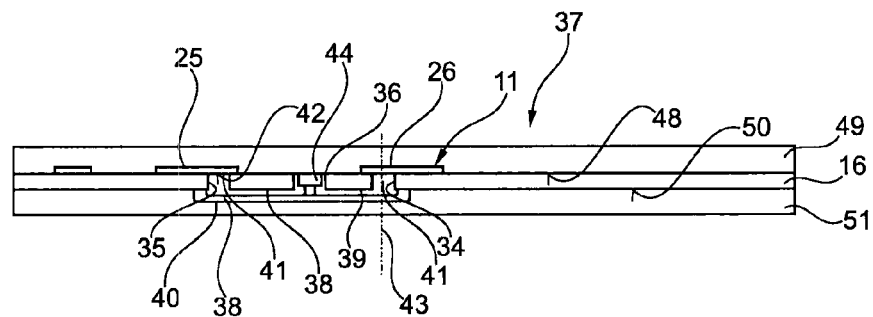
FIG. 3 shows a cross-sectional view of a chip card produced on the basis of the antenna substrate illustrated in FIG. 2 according to intersection lines III-III in FIG. 2.

As is also apparent from the illustration according to FIG. 2, in the antenna substrate 16 substrate recesses 34, 35 and 36 are each formed beneath the terminal contacts 25 and 26 as well as between the terminal contacts 25, 26. As is shown in FIG. 3, the substrate recesses 34, 35 serve for direct contacting with terminal conductors 38, 39 of a chip carrier 40 when a chip card 37 is formed on the basis of the antenna substrate 16. In this context, the terminal conductors 38, 39, in the case at hand, are contacted, with the aid of raised contacts formed on the terminal conductors 38, 39, with a contact rear side 42 of the terminal contacts 25, 26 in a direct manner, i.e. on a straight contact axis 43 without axial displacement as would be the case in the event of rewiring.

As is also apparent from FIG. 3, the substrate recess 36 formed between the terminal contacts 25, 26 in the antenna substrate 16 serves the purpose of accommodating a chip 44 which is contacted with the terminal conductors 38, 39 via its chip contacts 45, 46.

In the chip card 37 illustrated in FIG. 3, a chip module 47 is provided for contacting between the antenna substrate 16, respectively the terminal arrangement 24, of the antenna conductor structure 11 formed on the antenna substrate 16, in such a manner that the chip 44 in the substrate recess 36 is accommodated between a rear side 48 of a first cover layer 49 applied to the antenna conductor structure 11 and the chip carrier 40. The chip carrier 40 as such is accommodated between a rear side 50 of the antenna substrate 16 and a second cover layer 51 applied to the rear side 50.

Figure 4:
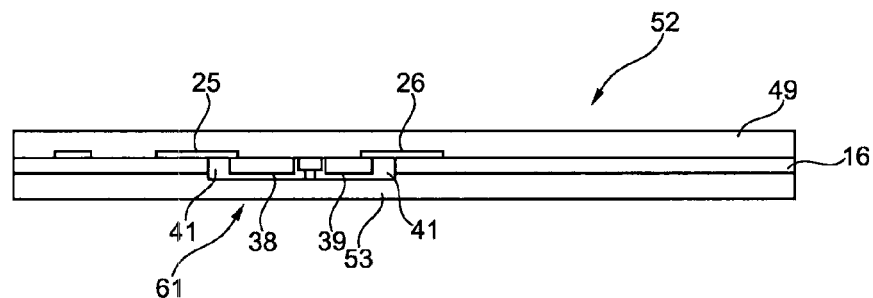
FIG. 4 shows another chip card in a view according to FIG. 3.

FIG. 4 shows a chip card 52 which differs from the chip card 37 illustrated in FIG. 3 in that, here, a chip module 61 is used, which has a chip carrier 53 that features dimensions being in conformity with the antenna substrate 16 and thus simultaneously forms a cover layer.

Figure 5:
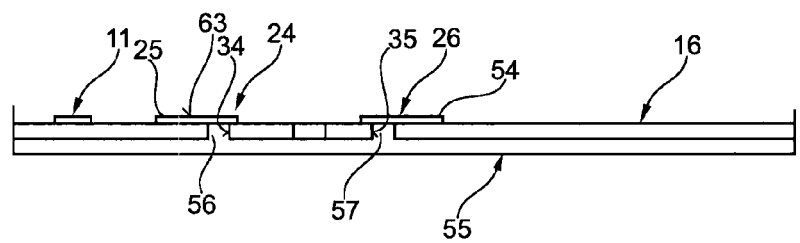
FIG. 5 shows an antenna substrate during the coating with a metallic coating applied to the substrate for the formation of the antenna conductor structure.

FIG. 5 shows an antenna substrate 16 directly after the realization of a coating of the antenna substrate 16 with a metallic conductor material 54 for the formation of the antenna conductor structure 11, respectively the terminal arrangement 24. Already prior the realization of the coating, in the antenna substrate 16 the substrate recesses 34, 35 and 36 are provided, wherein at least the substrate recesses 34, 35, which serve for the subsequent contacting with the chip 44, are filled during the coating process, in order to prevent the conductor material 54 from penetrating into the substrate recesses 34, 35. This can be performed by the aspect that, during coating, the antenna substrate 16 is disposed on a substrate carrier 55 which is provided with projections 56, 57 which engage into the substrate recess 34, 35 in a positive fitting manner. The projections 55, 56 at least on their coating surface are provided with an anti-adhesion coating, so that upon removal of the substrate carrier 55 from the antenna substrate 16, the arrangement of the terminal contacts 25, 26 illustrated in FIG. 5, which straddles the substrate recesses 34, 35, is preserved.

Figure 6:
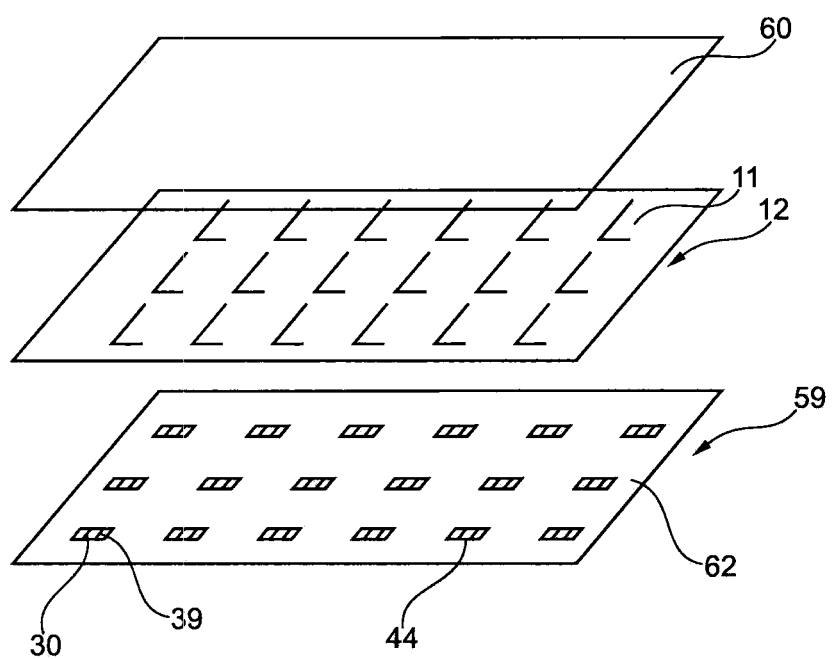
FIG. 6 shows a schematical view of a method for producing chip cards on the basis of an antenna arrangement formed on a substrate sheet.

FIG. 6 is supposed to once again highlight the sequence of the individual method steps, which are necessary for instance for the production of the chip card 52 illustrated in FIG. 4.

Firstly, an arrangement of a substrate sheet 12 having a plurality of antenna conductor structures 11 disposed in a matrix arrangement 13 on a chip module sheet 59 is performed, which features a plurality of chip modules 61 disposed in a structure and which corresponds to the number of antenna conductor structures 11. The terminal conductors 38, 39 of the individual chip modules 61 are here arranged in such a manner that the raised contacts 41 disposed thereon are positioned so as to overlap the terminal contacts 25, 26 of the antenna conductor structures 16 in such a manner that upon arrangement of the substrate sheet 12 on the chip module sheet 59, the raised contacts 41 engage into the substrate recesses 34, 35. Subsequently, for instance by means of subjecting the terminal contacts 25, 26 to ultrasound from their upper side, a welding of the terminal contacts 25, 26 with the raised contacts 41 of the terminal conductors 38, 39 can be performed. Subsequently, a cover layer sheet 60 can be applied to the substrate sheet 12 from above, in order to complete the laminate structure for the production of a number of chip cards which corresponds to the matrix arrangement.

For separating the individual chip cards 52 from the thus produced chip card structure, a separating and cutting process is subsequently performed along the row separation lines 18 and the column separation lines 17 of the substrate sheet 12.

The invention claimed is:

1. An antenna arrangement for the production of chip cards, in particular chip cards used in the UHF frequency range, said arrangement comprising:
a substrate; and
a plurality of antenna conductor structures formed on the substrate, the antenna conductor structures having a terminal arrangement for connecting the antenna conductor structures to a chip, wherein the substrate is formed as a substrate sheet, and the antenna conductor structures are disposed on the substrate sheet in a matrix arrangement having a plurality of columns and rows, wherein the antenna conductor structures include at least one dipole arrangement, said at least one dipole arrangement including a first antenna strand and a second antenna strand, said first antenna strand extending longitudinally along a column separation line and said second antenna strand extending along a row separation line, said column separation line and said row separation line separating the antenna conductor structures and intersecting in an intersection zone, said first antenna strand and said second antenna strand being connected in said intersection zone via a coupling conductor section.

2. The antenna arrangement according to claim 1, in which the terminal arrangements for connecting the antenna conductor structures to the chip are formed as a loop dipole having a coupling conductor section which is disposed in parallel to the coupling conductor section of the assigned antenna conductor structure.

3. The antenna arrangement according to claim 1, in which the terminal arrangements feature at least two planarly designed terminal contacts extending over substrate recesses and being open towards a substrate rear side.

4. The antenna arrangement according to claim 3, in which the terminal contacts are applied to an antenna substrate in the form of a material coating using a coating method and are formed integrally with coupling conductor sections of the terminal arrangements.

5. The antenna arrangement according to claim 4, in which the antenna conductor structures and the terminal arrangements are formed of a congruent material coating.

6. The antenna arrangement according to claim 1, in which the terminal arrangements are formed of aluminum or of an alloy containing aluminum.

7. The antenna arrangement according to claim 1, in which the terminal arrangements are formed of copper or of an alloy containing copper.

8. A laminate structure for the production of chip cards, comprising an antenna arrangement according to claim 1, in which the terminal arrangements and the dipole arrangements of the antenna conductor structures are formed on separate substrate sheets which are planarly connected to one another for the production of the antenna conductor structures.

* * * * *